(12) United States Patent
Besser et al.

(10) Patent No.: US 10,847,807 B2
(45) Date of Patent: Nov. 24, 2020

(54) FLEXIBLE, PLANAR, DOUBLE SIDED AIR BREATHING MICROSCALE FUEL CELL

(71) Applicant: The Trustees of the Stevens Institute of Technology, Hoboken, NJ (US)

(72) Inventors: Ronald Besser, New Providence, NJ (US); Seyed Reza Mahmoodi, Weehawken, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 114 days.

(21) Appl. No.: 15/814,208

(22) Filed: Nov. 15, 2017

(65) Prior Publication Data

US 2018/0138516 A1 May 17, 2018

Related U.S. Application Data

(60) Provisional application No. 62/422,820, filed on Nov. 16, 2016.

(51) Int. Cl.
| | | |
|---|---|---|
| *H01M 8/1004* | (2016.01) | |
| *H01M 4/86* | (2006.01) | |
| *H01M 8/0271* | (2016.01) | |
| *H01M 8/1018* | (2016.01) | |
| *H01M 8/00* | (2016.01) | |
| *H01M 8/241* | (2016.01) | |
| *H01M 8/1007* | (2016.01) | |
| *H01M 8/1067* | (2016.01) | |
| *H01M 8/1039* | (2016.01) | |

(52) U.S. Cl.
CPC ......... *H01M 4/8605* (2013.01); *H01M 8/006* (2013.01); *H01M 8/0271* (2013.01); *H01M 8/1004* (2013.01); *H01M 8/1007* (2016.02); *H01M 8/1018* (2013.01); *H01M 8/241* (2013.01); *H01M 8/1039* (2013.01); *H01M 8/1067* (2013.01); *H01M 2008/1095* (2013.01); *H01M 2250/30* (2013.01); *Y02B 90/18* (2013.01)

(58) Field of Classification Search
None
See application file for complete search history.

(56) References Cited

U.S. PATENT DOCUMENTS

| | | | | |
|---|---|---|---|---|
| 2004/0053100 A1* | 3/2004 | Stanley | ............... | H01M 8/2404 429/457 |
| 2010/0015490 A1* | 1/2010 | Yamada | ............. | H01M 8/04119 429/414 |
| 2010/0119903 A1* | 5/2010 | Hahn | .................. | H01M 8/0204 429/457 |

OTHER PUBLICATIONS

S. Giddey et al., Investigations on fabrication and lifetime performance of self-air breathing direct hydrogen micro fuel cells, International Journal of Hydrogen Energy, 2010, 2506-2516, 35.

(Continued)

*Primary Examiner* — Magali P Slawski
(74) *Attorney, Agent, or Firm* — Lewis Roca Rothgerber Christie; Ralph W. Selitto, Jr.; John K. Kim

(57) ABSTRACT

Flexible air-breathing microscale fuel cells are produced using ion exchange polymer membranes without silicon substrates or other rigid components. The microscale fuel cells provide long-life energy supply sources in portable electronics due to reduced volume, high energy density, and low cost. More particularly, the microscale fuel cell has a direct hydrogen flow-through porous anode electrode with a pair of air-breathing cathodes.

20 Claims, 5 Drawing Sheets

(56) References Cited

OTHER PUBLICATIONS

J. Fernandez-Moreno et al., A portable system powered with hydrogen and one single air-breathing PEM fuel cell, Applied Energy, 2013, 60-66, 109.

Sung Han Kim et al., Ultra compact direct hydrogen fuel cell prototype using a metal hydride hydrogen storage tank for a mobile phone, Applied Energy, 2014, 382-391,134.

Narissara Bussayajarn et al., Planar air breathing PEMFC with self-humidifying MEA and open cathode geometry design for portable applications, International Journal of Hydrogen Energy, 2009, 7761-7767, 34.

Jeremy P. Meyers et al., Design considerations for miniaturized PEM fuel cells, Journal of Power Sources, 2002, 76-88, 109.

Seong Uk Jeong et al., Effects of cathode open area and relative humidity on the performance of air-breathing polymer electrolyte membrane fuel cells, Journal of Power Sources, 2006, 348-353, 158.

Tibor Fabian et al., The role of ambient conditions on the performance of a planar, air-breathing hydrogen PEM fuel cell, Journal of Power Sources, 2006,168-182,161.

J.P. Esquivel et al., Towards a compact SU-8 micro-direct methanol fuel cell, Journal of Power Sources, 2010, 8110-8115, 195.

Ayokunle Omosebi et al., Fabrication and performance evaluation of an in-membrane micro-fuel cell, Journal of Power Sources, 2013, 672-676, 242.

Keyur Shah et al., A PDMS micro proton exchange membrane fuel cell by conventional and non-conventional microfabrication techniques, Sensors and Actuators B, 2004, 157-167, 97.

Shinji Motokawa et al., MEMS-based design and fabrication of a new concept micro direct methanol fuel cell (μ-DMFC), Electrochemistry Communications, 2004, 562-565, 6.

Fandi Ning et al., Flexible and Lightweight Fuel Cell with High Specific Power Density, American Chemical Society, 2017, 5982-5991, 11.

Ikwhang Chang et al., Air-breathing Flexible Polydimethylsiloxane (PDMS)-based Fuel Cell, International Journal of Precision Engineering and Manufacturing, 2013, 501-504, 14 No. 3.

Yingqi Jiang et al., Design, fabrication and testing of a silicon-based air-breathing micro direct methanol fuel cell, Journal of Micromechanics and Microengineering, 2006, S233-S239, 16.

\* cited by examiner

FLEXIBLE, PLANAR, DOUBLE SIDED AIR BREATHING MICROSCALE FUEL CELL

CROSS-REFERENCE TO RELATED APPLICATIONS

The present application claims the benefit of U.S. Provisional Application No. 62/422,820, filed Nov. 16, 2016 and entitled FLEXIBLE, PLANAR, DOUBLE SIDED AIR BREATHING MICROSCALE FUEL CELL, which provisional application, including its specification, abstract and drawings, is incorporated herein by reference in its entirety.

FIELD OF THE INVENTION

The present invention relates to fuel cells and, more particularly, to micro-sized fuel cells that are flexible, planar, double sided, and air breathing, which are suitable for use as miniaturized energy sources. Throughout the present application, the terms "miniature," "microscale," "micro," and "small" are used interchangeably to refer to the very small scale of the fuel cells being discussed herein, i.e., less than about one millimeter in thickness.

BACKGROUND OF THE INVENTION

Clean, efficient and environmentally-friendly miniaturized energy sources remain one of the major challenges for improving electronic devices. Due to the spread of more compact and thinner portable electronic systems, miniaturization of micro power sources is as important as ever. The scaling down of energy sources promises higher volumetric efficiency, however, new designs and manufacturing processes are also required as a result. These new approaches are needed in order to meet the challenges of integrating system components without complex and bulky packaging which detract from the ultimate objectives of small system size and light weight.

Microscale fuel cells have been attracting much attention as leading candidates for prospective portable power sources and battery replacements as they benefit from large energy density, high efficiency, immediate recharging and inherent non-polluting characteristic. Building a microscale fuel cell that takes advantage of a microfluidic concept promises a highly efficient energy generator with increased surface-to-volume ratio within the fuel cell. Such micro fuel cell designs have the potential to satisfy the accelerating power generation demands in mobile applications. The success of microelectromechanical (hereinafter "MEMS") technology in making cheaper and more efficient products has created new pathways for micro fuel cell advancement.

Much effort in fuel cell miniaturization is focused on techniques based on silicon wafers because they are the most common substrate in MEMS technology. The combination of silicon-based devices with polymeric fuel cells at low scale can lead to inappropriate structural and materials adjustments. Polymeric materials and especially polydimethylsiloxane (hereinafter "PDMS") have been proposed to make micro fuel cell components due to their rapid and adaptable fabrication methods, however, the assembly of these materials typically needs a glass or other rigid substrate which compromises volumetric efficiency, and sealing still remains a challenge.

SUMMARY OF THE INVENTION

The present invention relates to flexible air-breathing microscale fuel cells having ion-exchange polymer membranes, without silicon substrates, as well as a direct hydrogen flow-through porous anode electrode with a pair of air-breathing cathodes. The microscale fuel cells provide long-life energy sources in portable electronics with reduced volume, high energy density, and low cost.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE EXEMPLARY EMBODIMENT

Figure 1:
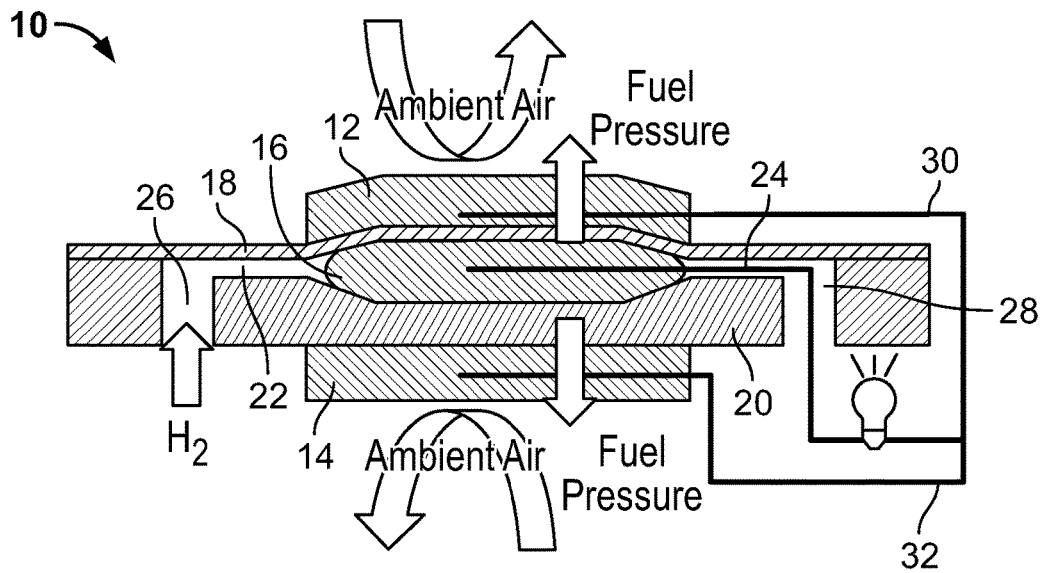
FIG. 1 is a schematic cross-sectional diagram showing the components of an exemplary embodiment of a microscale fuel cell and its operation.

The present disclosure provides a novel microscale microfluidic fuel cell of the proton exchange membrane (hereinafter "PEM") type, in which the micro flow channels, for fuel and oxidant input, and the membrane electrode assembly (hereinafter "MEA") are fabricated on a flat and flexible ion exchange polymer membrane without any other substrate. Suitable ion exchange polymer membrane materials include, for example without limitation, fluorinated polymers or co-polymers. Such fluorinated polymers and copolymers are commercially available, for example, under the tradename Fumatech BWT GMBh located in St. Ingbert, Germany, and under the tradename NAFION, from The Chemours Company located in Wilmington, Del., U.S.A., and under the tradename FLEMION from AGC Chemicals America located in Exton, Pa., U.S.A. Sulfonated polymers and copolymers are good proton conductors suitable for use in PEM fuel cells, as well as having excellent thermal and mechanical stability.

Making a microscale fuel cell on ion exchange polymer membranes provides the ability for considerable scaling down of the size of fuel cell packaging in two or three dimensions, while maintaining high power output. One major challenge of this method is cost-effective deep patterning of the ion exchange polymer membrane at small scale to produce patterned substrates having features of the required height or depth without damaging the characteristics of the membrane. Deep patterning creates small, high-resolution structures or patterns in the surface of a substrate, such as an ion exchange polymer membrane. Lacking the proper height or depth in the microfluidic structure poses the risk of the need to increase the fuel/oxidant running pressure, in which the costs of process control, energy expenditure, and the sealing of the microfluidic device also become more challenging.

Prior art PEM fuel cells (not shown) typically consist of a planar stacking of the membrane, electrocatalyst layers, carbon paper gas diffusion media, graphite flow field, and gold-plated metal current collectors. The thickness of a single stack assembly is several centimeters in size and significantly scales-up for a multi-stack assembly. Conversely, for the thin, microscale fuel cells described herein, a planar flexible stack can be constructed having less than a millimeter of thickness. The use of fewer materials, particularly the exclusion of the graphite flow field that accounts for greater than 50% of the fuel cell's weight, makes the designed microscale fuel cell a high energy density device.

The microscale fuel cell (μFC) described and disclosed herein is an air-breathing flexible device that is constructed out of ion exchange polymer membranes. Thermally sealed microchannels structured within the ion exchange polymer membranes make it possible for the microchannels to deliver the gas/fuel to the microchamber area and to discharge the excess reactants and/or byproducts. Alternatively, preventing discharge flow allows the device to operate in "dead-end" mode, in which the fuel is essentially completely reacted and no discharge from the anode area is required.

Figure 2:
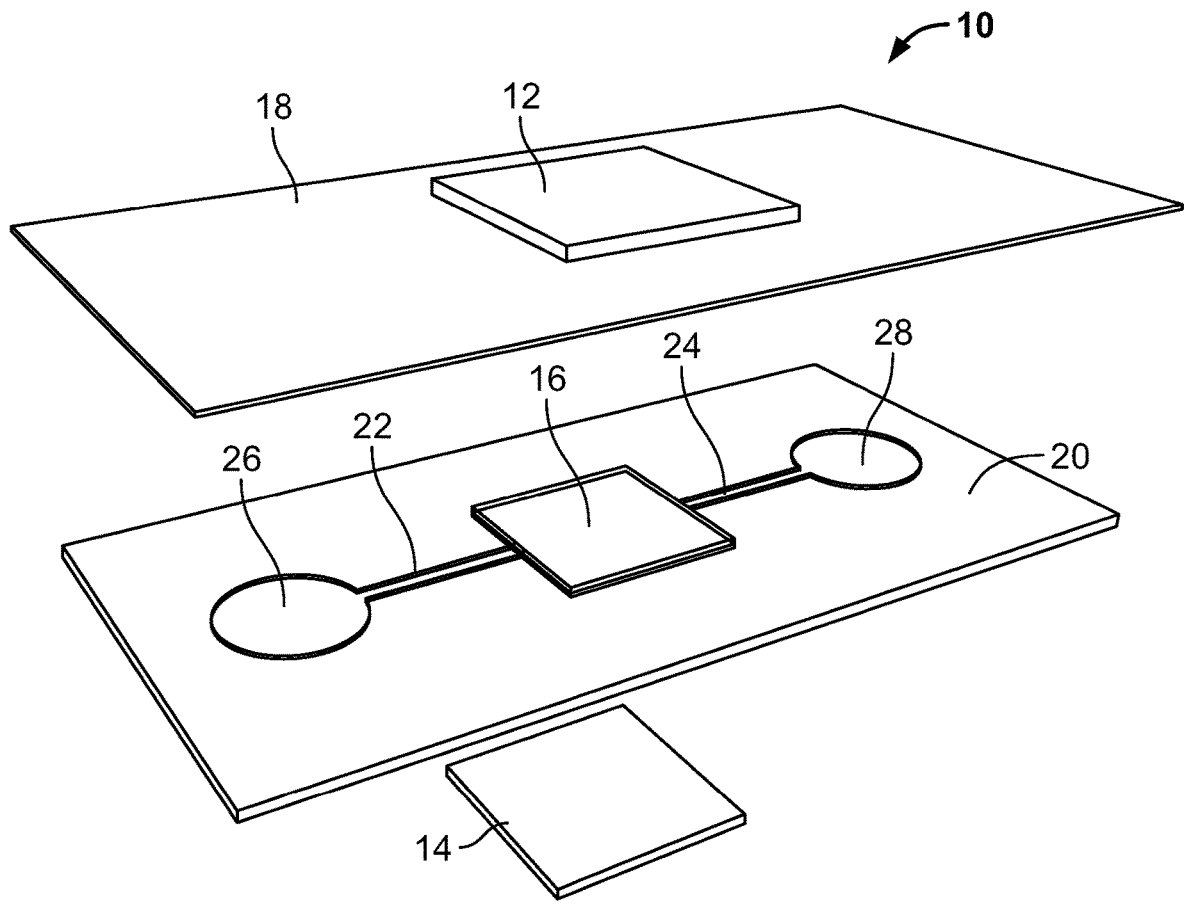
FIG. 2 is a schematic exploded diagram showing the components of the microscale fuel cell of FIG. 1.

With reference to FIGS. 1 and 2, in an exemplary embodiment, the microscale fuel cell 10 generally includes first and second generally planar, porous air-breathing cathodes 12, 14 with a shared anode 16 between them. The microscale fuel cell 10 can be considered an ordinary power source like a battery, whereby it is connected to any type of electrical load such as the lightbulb shown in FIG. 1.

The cathodes 12, 14 and anode 16 are known devices and may be made from carbon-based mesh, paper or cloth and infused or coated with a metal catalyst, such as but not limited to platinum, or another precious or non-precious metal, alone or in combination. By way of example only, the cathodes 12, 14 can be in the shape of a square having 5.0 mm sides, while the anode 16 can also be in the shape of a square having 4.0 mm sides.

As shown in FIGS. 1 and 2, interposed between the first cathode 12 and the anode 16 is a first ion exchange polymer membrane 18 and interposed between the second cathode 14 and the anode 16 is a second ion exchange polymer membrane 20. The ion exchange polymer membranes 18, 20 are typically sealed around the anode 16. In that regard, and by way of example only, the ion exchange polymer membranes 18, 20 can be in the shape of a rectangle having a width of 10.0 mm and a length of 20.0 mm. In an alternate embodiment, either the first cathode 12 or the second cathode 14 can be eliminated, whereby the resulting microscale fuel cell would comprise a single cathode, a single anode and a pair of ion exchange polymer membranes. Furthermore, the microscale fuel cell 10 includes at least one microchannel, such as the inlet and outlet microchannels 22, 24 shown in FIGS. 1 and 2. The inlet microchannel 22 is in fluid (i.e., liquid or gas) communication with the anode 16 and with an inlet opening 26 for the inlet (i.e., delivery) of reaction fluids (e.g., hydrogen). Similarly, the outlet microchannel 24 is in fluid (i.e., liquid or gas) communication with the anode 16 and an outlet opening 28, for the outlet (i.e., discharge) of reaction fluids (e.g., unreacted hydrogen and water vapor). The microchannels 22, 24, inlet opening 26, and outlet opening 28 are all patterned onto the ion exchange polymer membranes 18, 20 either by lithography processes or other processes known to persons of ordinary skill in the art (e.g., imprinting, embossing, etching and deposition). By way of example only, the microchannels 22, 24 can have a width of 0.4 mm, while the inlet opening 26 and the outlet opening 28 can have a radius of 1.5 mm.

The gas flow fields and current collectors (not shown per se) are integrated into the first and second porous air-breathing cathodes 12, 14. The sealing process employed to form the microscale fuel cell 10, which will be described below, also binds the microfluidic reaction chamber formed by the first and second ion exchange polymer membranes 18, 20 to porous media (i.e., the first and second porous air-breathing cathodes 12, 14), which creates a "flow-through porous" design for the microscale fuel cell 10. Also, the fabrication technique employed may be used to manufacture three-dimensional microchannel structures with varying thicknesses on arbitrary polymeric substrates.

In operation, ambient air (shown by curved arrows in FIG. 1) enters the microscale fuel cell 10 through the first and second porous air-breathing cathodes 12, 14. Hydrogen (shown by arrow $H_2$) enters the microscale fuel cell 10 through the inlet opening 26 and inlet microchannel 22, through which the hydrogen travels to the anode 16. The double-sided air breathing microscale fuel cell 10 produces electrical power that is generated from the reduction and oxidation half reactions occurring at the cathode and anode electrodes (which are integrated into the cathodes 12, 14 and anode 16 and, therefore, are not shown per se). Hydrogen or a small alcohol, such as for example, methanol, can be fed to the anode 16 as fuel, while oxygen passes through the cathodes 12, 14 to the anode 16. The anode oxidation reaction results in the production of protons and electrons. The protons are transported through the ion exchange polymer membranes 18, 20 to the cathodes 12, 14 on the top and bottom surfaces of the microscale fuel cell 10, while the electrons are conducted through electrical wires 30, 32 (see FIG. 1), doing work by powering the connected load (e.g., the lightbulb shown in FIG. 1).

In the present microscale fuel cell 10, the energy density has been increased using two air breathing cathodes 12, 14 sharing a common anode 16 to maximize the cathode interface to the ambient air, while the system components are stacked in parallel on a common anode 16 to further improve the energy density. The air-breathing cathodes 12, 14 are able to react passively with the oxygen from ambient air. Using air-breathing cathodes 12, 14 reduces the size, noise, costs and simplifies system requirements since oxygen inlet is fully passive. Also based on the advantages of the scaling laws and microfluidic environment, miniaturization promises reduced chemical consumption, safety, high surface-area-to-volume ratios, and improved control over mass and heat transfer superior to macroscopic reaction devices. In this respect, the microscale fuel cell 10 was miniaturized to improve its performance as a power generating device.

In the method disclosed and described herein, a hot embossing method is employed for patterning the ion exchange polymer membranes to fabricate microchannels. Hot embossing is a technique or method whereby a substrate or sheet of material, such as a polymer, is heated to a temperature at which it softens and can be made to flow easily. In this state, it is impressed with a stamp or master (created from a different material, such as a metal, which stays rigid under these conditions), which is a negative of the pattern that is to be created in the heated substrate material. The stamp is then withdrawn, leaving the desired pattern in the heated substrate material which hardens as it cools. The stamp can be reused, depending on the materials it is made from and the forces required for the embossing step. Hence a single stamp may, in principle, be used and reused to create many replicates of the patterned substrate.

Silicon (Si) is a common material to be used as the stamp for use in a hot embossing process since it can be patterned reliably by known fabrication processes. However, deep etching to create the required Si stamp is costly. In addition, such a Si stamp is prone to cleavage during hot pressing. Therefore, in exemplary embodiments of the microscale fuel cell described herein, another material such as stainless steel or other metal may be used to form the stamp. Alternatively, materials such as a photoresist or a metal such as nickel, can be layered on the Si substrate to make the stamp. Suitable photoresist materials include, for example without limitation, a thick epoxy-based negative photoresist. One such suitable epoxy-based negative photoresist material is commercially available under the tradename SU-8 from Micro-Chem Corporation, Newton, Mass., U.S.A. Further, it has been found that microscale patterning of ion exchange polymer membranes with an epoxy-based negative photoresist stamp is feasible without any surfactant coating, which is commonly required to assist in release of the stamp from the substrate. In addition, after imprinting or patterning the ion exchange polymer membrane, the patterned epoxy-based negative photoresist material can be placed on a new substrate and reused, which makes the epoxy-based negative photoresist a low-cost stamp option.

A process will now be described, in conjunction with FIGS. 3A-3E, for fabrication of a stamp 40 comprising a patterned epoxy-based negative photoresist material 42a on a Si substrate 44 and using that stamp 40 to pattern an ion exchange polymer membrane 46. First, a thick layer of epoxy-based negative photoresist material 42 is spin-coated onto a substrate 44 comprising Si and soft baked (see FIG. 3A). The epoxy-based negative photoresist material 42 is then patterned by photolithography or a similar technology. For example, although not shown per se in the figures, the epoxy-based negative photoresist material layer 42 may be exposed to UV light through a photomask to produce a pattern on the epoxy-based negative photoresist material layer 42. After such UV exposure, a two-step bake process may be employed to crosslink the stamp 40. The stamp 40 may then be subjected to a development process whereby soluble material is removed from the epoxy-based negative photoresist material layer 42. After development, the patterned epoxy-based negative photoresist stamp 42a may be hard baked to enhance its rigidity at high temperature. The foregoing techniques produce the stamp 40 shown schematically in FIG. 3B comprising the patterned epoxy-based negative photoresist material layer 42a on a Si substrate 44.

Figure 3A:
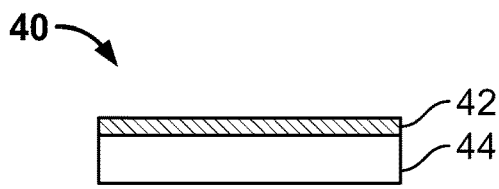
FIGS. 3A-3E show the steps of a method for production of a patterned ion exchange polymer membrane suitable for use in an exemplary embodiment of the microscale fuel cell.
Figure 3B:
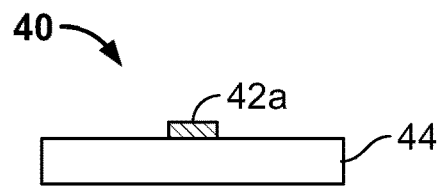
Figure 3C:
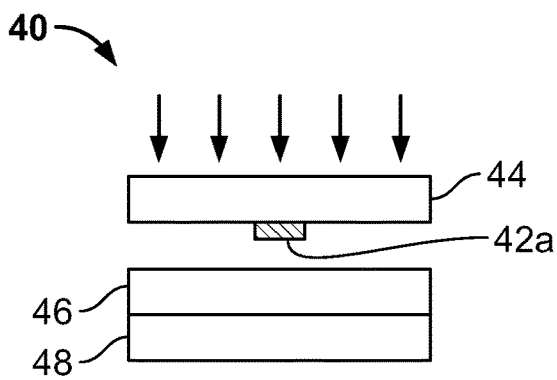
Figure 3D:
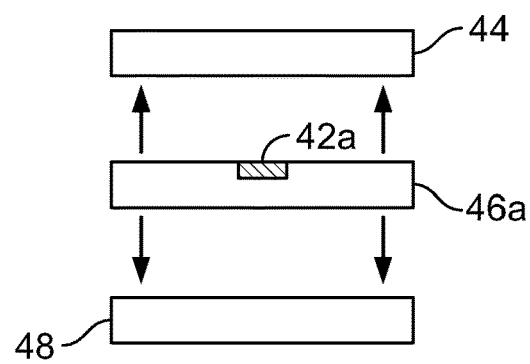
Figure 3E:
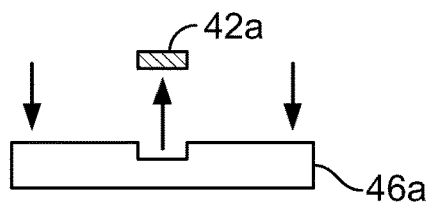

With reference now to FIGS. 3C to 3E, using the stamp 40 to pattern an untreated ion exchange polymer membrane 46 will now be described. More particularly, the untreated ion exchange polymer membrane 46 is sandwiched between the stamp 40 and a second substrate layer 48, which may also comprise Si and having same dimensions as the stamp 40 (see FIG. 3C). The sandwiched layers (not shown per se) are then placed into a suitable embossing apparatus (not shown) for hot embossing at a temperature of from about 170° C. to about 200° C., a pressure of from about 120 pounds per square inch (psi) to about 180 psi, for a period of time of from about 2 to about 5 minutes. During hot embossing, the pattern on the patterned epoxy-based negative photoresist material layer 42a is impressed into the ion exchange polymer membrane 46 to form a patterned ion exchange polymer material membrane 46a (see FIG. 3D). The embossed layers are removed from the apparatus and separated manually from the two Si substrates 44, 48, leaving the patterned epoxy-based negative resist 42a embedded in the patterned ion exchange polymer membrane 46a. The patterned ion exchange polymer membrane 46a may be released from the patterned epoxy-based negative photoresist 42a (see FIG. 3E) by simply bending the flexible patterned ion exchange polymer membrane 46a.

Figure 4:
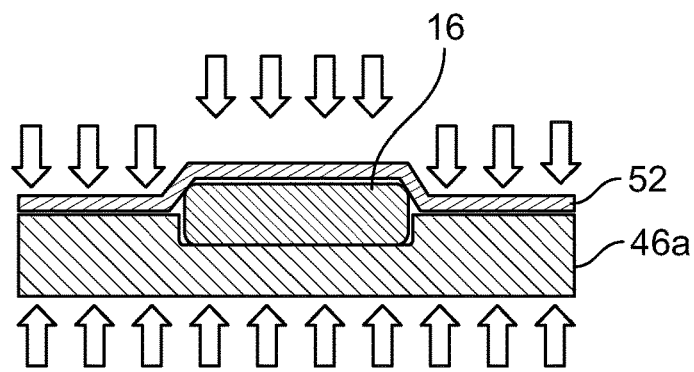
FIG. 4 is a schematic diagram showing an exemplary method for sealing ion exchange polymer membranes around an anode.

FIG. 4 is a schematic representation showing a portion of the process for making a microscale fuel cell 10 in accordance with the description provided herein. More particularly, using a thermal sealing process, the anode 16 is sealed in between the patterned ion exchange polymer membrane 46a (as described above) and a second ion exchange polymer membrane 52, which may be patterned or untreated. For example, a thermal sealing process which involves gas-cushion hot pressing (as shown by arrows in FIG. 4) may be employed. In some embodiments, the thermal sealing process is performed at a temperature of from about 220° C. to about 250° C., a pressure of from about 100 psi to about 150 psi, for a period of time of from about 2 to about 5 minutes.

Figure 6:
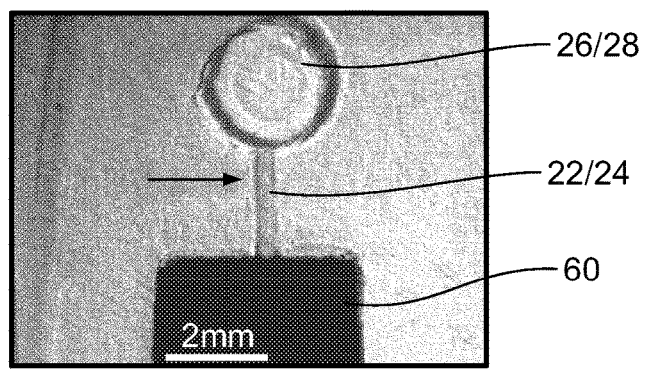
FIG. 6 is a microscopic top view of an inlet microchannel and an inlet in fluid (i.e., liquid or gas) communication with an anode chamber.

In some embodiments, the second ion exchange polymer membrane 52 may be made of a different ion exchange polymer material and in other embodiments both membranes 46a, 52 may be made of the same type of ion exchange polymer material. For example, the second ion exchange polymer membrane may be made of a higher power density ion exchange polymer material. Using the patterned ion exchange polymer membrane 46a results in a microscale fuel cell 10 having microchannels (not shown) defined by those in the pattern on the ion exchange polymer membrane 46a. FIG. 6, for example, shows a microscopic photograph of a microchannel 22, 24 and corresponding inlet or outlet opening 26, 28 in communication with a microchamber 60 in which the anode 16 is positioned.

Thus, a process for production of a microscale fuel cell where a patterned ion exchange polymer membrane is employed would include the following steps:

1. Hot embossing molds are fabricated from epoxy-based negative photoresist by photolithography on a Si substrate.

2. Patterning of the ion exchange polymer membrane is performed in a gas-cushion pressure chamber, intended for a uniform pressure distribution and unvarying microchannel depths, by hot embossing the prepared mold onto the ion exchange polymer membrane.

3. The electrocatalyst layer is coated on the cut carbon papers for the anode and cathode electrodes with appropriate catalyst loading.

4. In the thermal sealing step, another ion exchange polymer membrane covers the entire patterned ion exchange polymer membrane and these membranes are sealed around the anode by gas-cushion hot pressing.

Figure 5A:
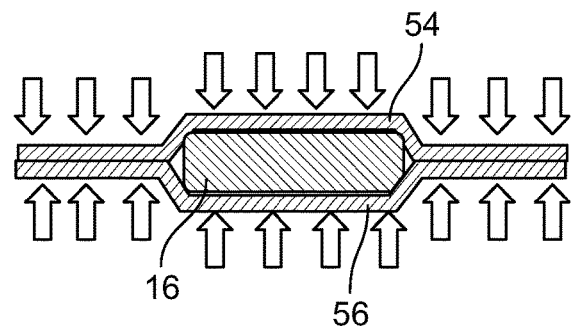
FIGS. 5A and 5B are schematic drawings showing an alternative exemplary method for sealing ion exchange membranes around an anode and simultaneously forming microchannels.
Figure 5B:
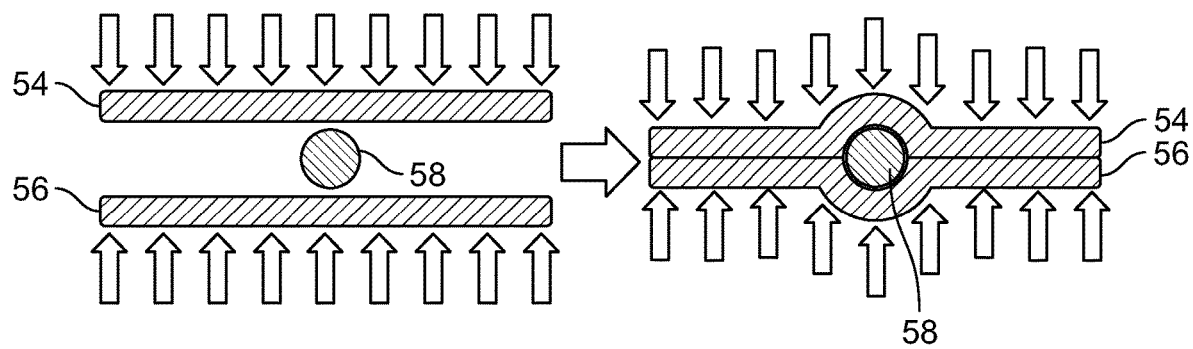

FIGS. 5A-5B provide a schematic representation of a portion of a different process for making a microscale fuel cell 10 in accordance with the description provided herein. More particularly, this different process does not use a patterned ion exchange polymer membrane, but rather, two untreated ion exchange polymer membranes 54, 56 are layered on either side of the anode 16 and sealed around the anode 16, again by a thermal sealing process such as gas-cushion hot pressing under the conditions described above. In such embodiments, the untreated ion exchange polymer membranes 54, 56 may be made of the same or different ion exchange polymer materials. For example, one or both of the untreated ion exchange polymer membranes 54, 56 may be made of higher power density ion exchange polymer material when this process is employed.

FIG. 5B schematically shows the procedure to fabricate microchannels in the sealing process which does not employ a patterned ion exchange polymer membrane. A copper wire 58 may be employed as a mold positioned in between the ion exchange polymer membranes 54, 56 to form microchannels during the gas-cushioned hot embossing procedure. After hot embossing, the copper wire 58 can be drawn out of the microchannels (not shown) through the inlet and outlet openings (not shown).

In the microscale fuel cell described herein, endplates were eliminated by incorporating porous carbon papers both for current collecting and gas flow fields. This results in very compact designs, while bringing in the unique advantages of a "flow through" porous media instead of a more conventional "flow-over" porous electrode design. The forced convection through the electrodes avoids flooding and gas diffusion limitations, thereby extending the linear region of the cell potential versus current density plot and hence improving the cell performance.

Regarding the power product of the microscale fuel cell, although higher power densities are accessible in supported cells/stacks with planar configurations, our flexible micro fuel cell can deliver higher volumetric power density (i.e., approximately 437 milliWatts per square centimeter (mW/cm$^3$)) than its reported air-breathing counterparts. This performance gap may be further enhanced when considering gravimetric power densities. Moreover, the very thin device is promising for two-dimensional stacking.

EXAMPLES

Sample microscale fuel cells were prepared by both sealing methods described above, i.e., one using a patterned ion exchange membrane and another using only untreated ion exchange polymer membranes.

A stamp having SU-8 on a Si substrate was fabricated and then used to pattern a NAFION® membrane. First, a thick layer of SU-8-2100 photoresist (MicroChem Corporation, Newton, Mass., USA) was spin-coated, soft baked and exposed to UV light through a photomask. After exposure, a two-step bake was employed to crosslink the polymer. After development, the patterned SU-8 micro stamps were hard baked to enhance their rigidity at high temperature. Untreated Nafion 1110 membranes were sandwiched between the stamp and a Si substrate with the same dimensions as the stamp. The sandwiched samples were then hot embossed at 190° C. and 160 psi for 5 min. The embossed samples were separated from the two Si substrates manually, leaving the SU-8 mold in the Nafion. The samples were released from the SU-8 mold by simply bending the membranes.

Figure 9:
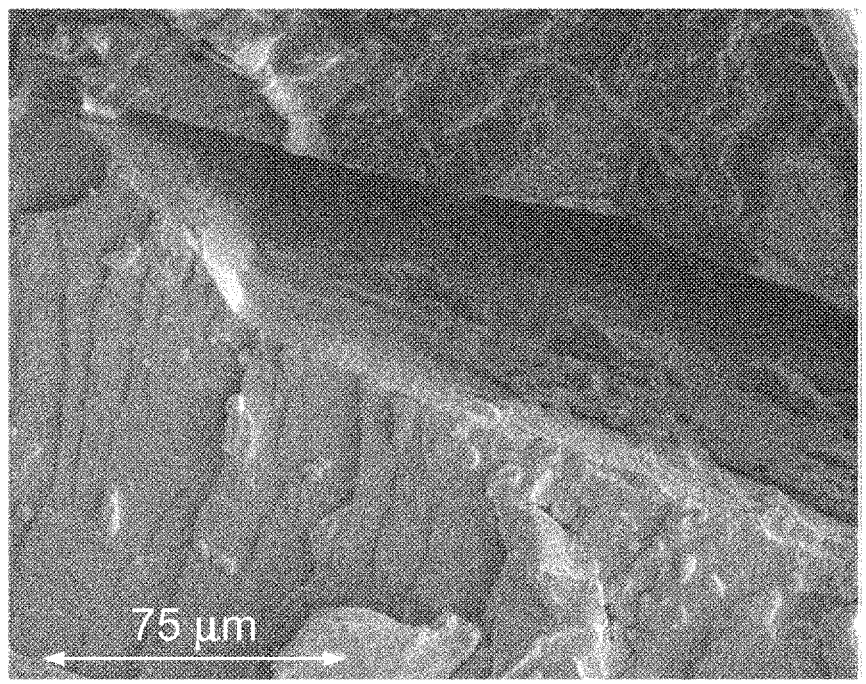
FIG. 9 is a microscopic top view of a microchannel produced by the sealing method shown in FIG. 4.

Anodes were sealed between ion exchange polymer membranes according to both methods described above in connection with FIGS. 4 and 5A-5B. In the sealing step for the method shown in FIG. 4, a 212 Nafion sheet covered the entire patterned Nafion 1110 substrate by gas-cushion hot pressing. The thermal sealing was done at 220° C. and 130 psi without any Si substrate involved for both methods. FIG. 9 shows a micrograph of a microchannel formed by the aforesaid method.

Figure 10:
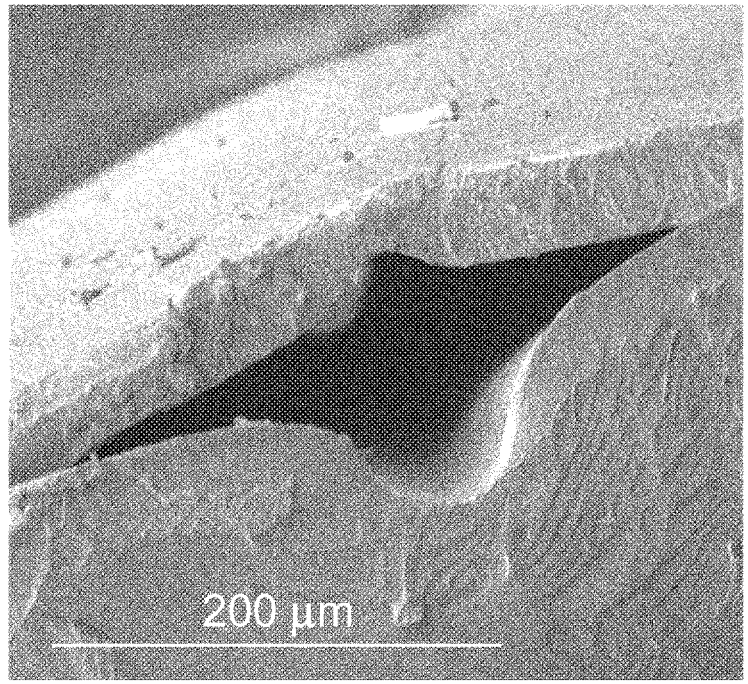
FIG. 10 is a microscopic top view of a microchannel produced by the sealing method shown in FIGS. 5A and 5B.

In the method shown in FIGS. 5A-5B, the porous carbon electrode was employed as the mold for the sealing step. In other words, for the method shown in FIGS. 5A-5B the microlithography process for patterning the thick Nafion film was eliminated and it was then possible to use the higher power density 212 Nafion for both ion exchange polymer membranes on both sides of the microscale fuel cell. The procedure illustrated in FIG. 5B was used to fabricate the microchannels. More particularly, a copper wire was employed as a mold to form the microchannels in a gas-cushioned hot embossing chamber. After hot embossing, the copper wires were drawn out through the inlet and outlet openings. FIG. 10 shows a micrograph of a microchannel formed by the aforesaid sealing method using the copper wire to form the microchannels.

In accordance with the arrangement shown in FIG. 2, the microscale fuel cell consisted of five layers. The mask design embossed into the patterned ion exchange polymer membrane included two 400 micron-width microchannels to connect the gas inlet and outlet openings to a 0.5×0.5 cm$^2$ anode chamber in the middle of the device. The anode chamber was filled with a porous carbon paper screen printed with a catalyst layer on both sides. FIG. 6 is a microscopic top-view of the inlet microchannel connecting the inlet opening to the anode microchamber.

The performance of the assembled microscale fuel cell was assessed at room temperature, hydrogen delivery at atmospheric pressure (no back pressure), and ambient air pressure on the cathode surfaces. To stabilize the performance results at different flow conditions, electrical testing was preceded by a dry hydrogen conditioning period at 10 standard cubic centimeters per minute (sccm) and 0.6 Volt for two hours. For performance testing, H$_2$ was fed from 10 sccm to 40 sccm to the anode microchamber.

Figure 7:
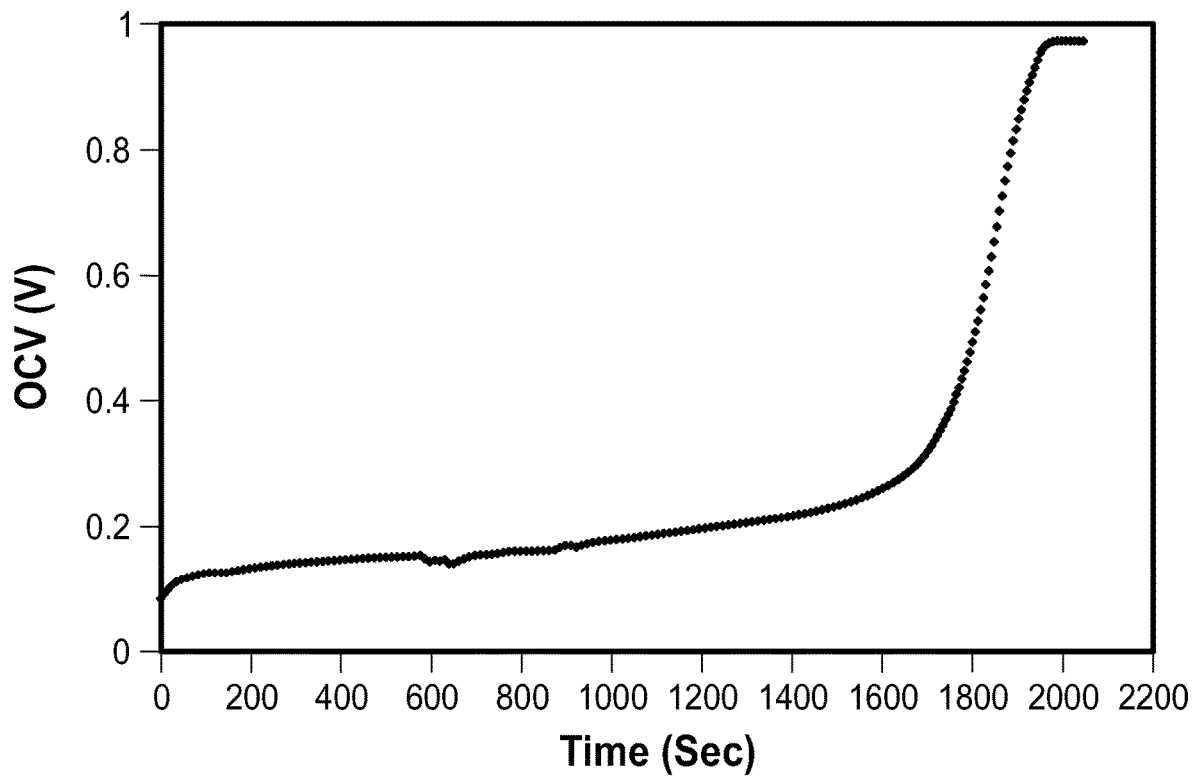
FIG. 7 is a graph showing the open circuit voltage over time for a sample microscale fuel cell produced in accordance with the methods described herein.
Figure 8:
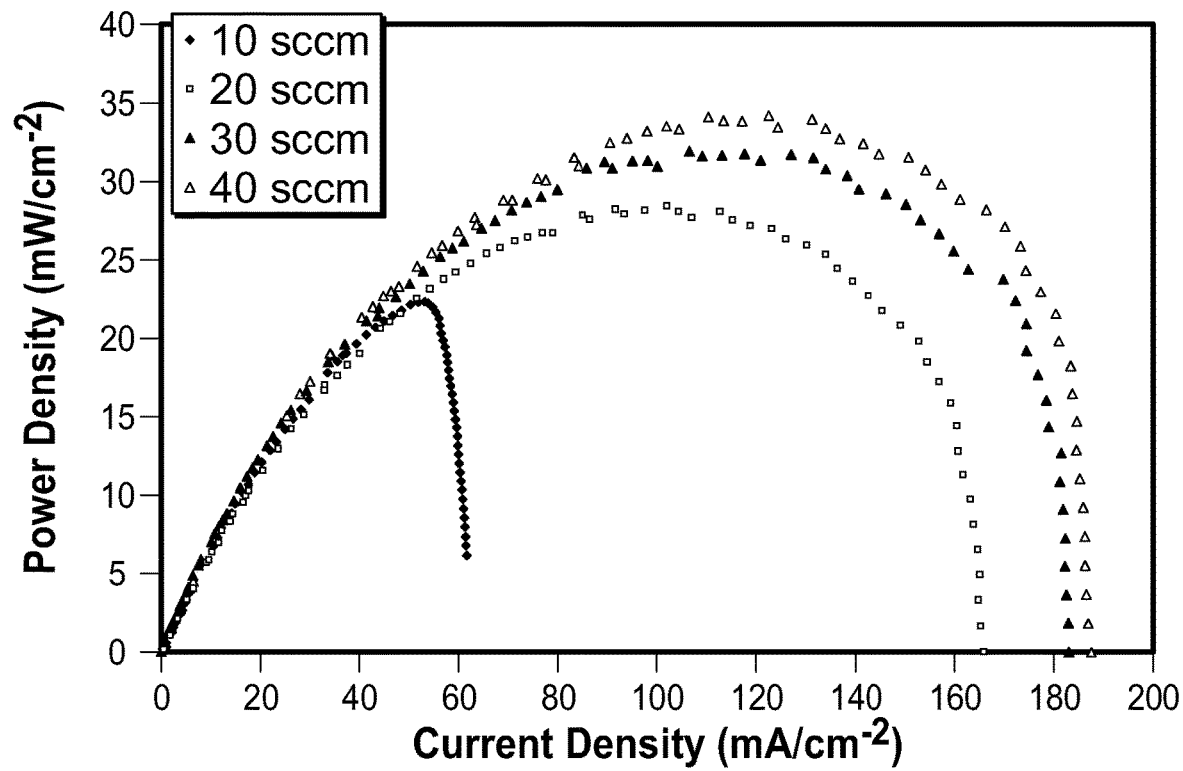
FIG. 8 is a graph showing the power density for various current densities at various hydrogen flow rates for a sample microscale fuel cell produced in accordance with the methods described herein.

FIG. 7 shows the open circuit voltage (OCV) of the microscale fuel cell versus time for a feed rate of 10 sccm H$_2$ fuel. After applying hydrogen, the OCV increased at a slow speed followed by a rapid rise to a maximum of 0.97 V and remained nearly constant after that. FIG. 8 shows the power density curves for a flexible microscale fuel cell operated at different hydrogen flow rates in ambient conditions. As shown, increasing the flow rate generally improved the performance and the maximum power density increased with increase in the flow rate. At 10 sccm hydrogen flow rate, the maximum power density was about 22 mWcm$^{-2}$ and it increased significantly with an increase in flow rate to 20 sccm. A minor improvement in maximum power density (27.6 to 34.2 mWcm$^{-2}$) was observed by increasing the hydrogen flow rate from 20 to 40 sccm.

While at least one exemplary embodiment has been presented in the foregoing detailed description, it should be appreciated that various additional embodiments and modifications are possible that remain within the intent and function of the invention described and contemplated herein. It should also be appreciated that the exemplary embodiment or embodiments are merely examples, and are not intended to limit the scope, applicability, or configuration of the invention in any way. The foregoing detailed description provides those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A flexible micro-scale fuel cell, comprising:
   a first substantially flat and flexible ion exchange polymer membrane having a first substantially planar surface on one side of said first ion exchange polymer membrane and a second substantially planar surface on an opposite side of said first ion exchange polymer membrane;
   a second substantially flat and flexible ion exchange polymer membrane having a third substantially planar surface on one side of said second ion exchange polymer membrane and a fourth substantially planar surface on an opposite side of said second ion exchange polymer membrane, said third substantially planar surface of said second ion exchange polymer membrane being in direct physical contact with said second substantially planar surface of said first ion exchange polymer membrane such that said second and third substantially planar surfaces cooperate to constitute a pair of interfacing surfaces and such that said first and fourth substantially planar surfaces constitute a pair of air-breathing sides of said fuel cell;
   a porous anode interposed between and in contact with said pair of interfacing surfaces;
   an inlet opening for reaction fluid, said inlet opening being located to one side of said anode and formed in at least one of said interfacing surfaces;
   an outlet opening for reaction fluid, said outlet opening being located to an opposite side of said anode and formed in at least one of said interfacing surfaces;
   a first microchannel formed in at least one of said interfacing surfaces, said first microchannel being in fluid communication with said inlet opening and said anode;
   a second microchannel formed in at least one of said interfacing surfaces, said second microchannel being in fluid communication with said outlet opening and said anode; and
   at least one air-breathing cathode located on at least one of said air-breathing sides of said fuel cell.

2. The flexible micro-scale fuel cell of claim 1, wherein said interfacing surfaces are sealed together around said anode, said inlet and outlet openings and said first and second microchannels.

3. The flexible micro-scale fuel cell of claim 2, wherein said inlet opening is formed in only one of said interfacing surfaces and wherein said outlet opening is formed in only one of said interfacing surfaces.

4. The flexible micro-scale fuel cell of claim 2, wherein said inlet opening is formed in both of said interfacing surfaces.

5. The flexible micro-scale fuel cell of claim 2, wherein said outlet opening is formed in both of said interfacing surfaces.

6. The flexible micro-scale fuel cell of claim 2, wherein said first microchannel is formed in only one of said interfacing surfaces and wherein said second microchannel is formed in only one of said interfacing surfaces.

7. The flexible micro-scale fuel cell of claim 2, wherein said first microchannel is formed in both of said interfacing surfaces.

8. The flexible micro-scale fuel cell of claim 2, wherein said second microchannel is formed in both of said interfacing surfaces.

9. The flexible micro-scale fuel cell of claim 1, wherein said first and second ion exchange polymer membranes are made from the same material.

10. The flexible micro-scale fuel cell of claim 1, wherein said first and second ion exchange polymer membranes are made from fluorinated polymers or fluorinated co-polymers.

11. The flexible micro-scale fuel cell of claim 1, wherein said fuel cell is of the proton exchange membrane type.

12. The flexible micro-scale fuel cell of claim 1, wherein said inlet opening and said first microchannel cooperate with said second microchannel and said outlet opening to permit the flow of reaction fluid through said anode from one end thereof to an opposite end thereof.

13. The flexible micro-scale fuel cell of claim 1, wherein said at least one air-breathing cathode includes a first air-breathing cathode on one of said air-breathing sides of said fuel cell and a second air-breathing cathode on the other air-breathing side of said fuel cell.

14. The flexible micro-scale fuel cell of claim 13, wherein said first air-breathing cathode is positioned on said first substantially planar surface of said first ion exchange polymer membrane and wherein said second air-breathing cathode is positioned on said fourth substantially planar surface of said second ion exchange polymer membrane.

15. A method of making a flexible micro-scale fuel cell, comprising the steps of:
   providing a porous anode;
   interposing said anode between substantially planar interfacing surfaces, respectively, of a pair of substantially flat and flexible ion exchange polymer membranes such that said interfacing surfaces are in direct physical contact with one another around said anode;
   providing an inlet opening for reaction fluid in at least one of said interfacing surfaces to one side of said anode;
   providing an outlet opening for reaction fluid in at least one of said interfacing surfaces to an opposite side of said anode;
   providing a first microchannel in at least one of said interfacing surfaces, said first microchannel being in fluid communication with said inlet opening and said anode;
   providing a second microchannel in at least one of said interfacing surfaces, said second microchannel being in fluid communication with said outlet opening and said anode; and
   arranging an air-breathing cathode on an air-breathing side of one of said ion exchange polymer membranes, said air-breathing side being opposite a corresponding one of said interfacing surfaces, whereby said air-breathing cathode is arranged on one air-breathing side of said fuel cell.

16. The method of claim 15, further comprising the step of arranging another air-breathing cathode on an air-breathing side of the other of said ion exchange polymer membranes, whereby said another air-breathing cathode is arranged on another air-breathing side of said fuel cell.

17. The method of claim 16, wherein said another air-breathing side of said fuel cell is opposite said one air-breathing side of said fuel cell.

18. The method of claim 15, wherein said inlet opening, said outlet opening, said first microchannel and said second microchannel are patterned onto at least one of said interfacing surfaces of said first and second ion exchange polymer membranes.

19. The method of claim 15, wherein said interfacing surfaces form a seal around said anode, said inlet and outlet openings and said first and second microchannels.

20. The method of claim 15, wherein said first and second ion exchange polymer membranes are made from fluorinated polymers or fluorinated co-polymers.

\* \* \* \* \*